United States Patent
Na

(10) Patent No.: US 10,127,884 B2
(45) Date of Patent: Nov. 13, 2018

(54) METHOD AND ELECTRONIC DEVICE FOR DISPLAYING CONTENT

(71) Applicant: Samsung Electronics Co., Ltd., Gyeonggi-do (KR)

(72) Inventor: Hwa Suk Na, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 8 days.

(21) Appl. No.: 15/123,806

(22) PCT Filed: Mar. 3, 2015

(86) PCT No.: PCT/KR2015/002033
§ 371 (c)(1),
(2) Date: Sep. 6, 2016

(87) PCT Pub. No.: WO2015/133788
PCT Pub. Date: Sep. 11, 2015

(65) Prior Publication Data
US 2017/0018248 A1    Jan. 19, 2017

(30) Foreign Application Priority Data
Mar. 4, 2014    (KR) .......................... 10-2014-0025592

(51) Int. Cl.
*G09G 5/00*        (2006.01)
*G06F 3/14*        (2006.01)
(Continued)

(52) U.S. Cl.
CPC ............. *G09G 5/003* (2013.01); *G06F 1/163* (2013.01); *G06F 1/1652* (2013.01); *G06F 3/011* (2013.01);
(Continued)

(58) Field of Classification Search
CPC .......... G09G 5/003; G09G 2320/0261; G09G 2340/0492; G09G 2354/00; G09G 2358/00; G06F 1/163; G06F 1/1652; G06F 3/011; G06F 3/013; G06F 3/0304; G06F 3/0346; G06F 3/0481; G06F 3/04883; G06F 3/14; G06F 21/00; H04M 1/72
See application file for complete search history.

(56) References Cited

U.S. PATENT DOCUMENTS 8,782,084 B2    7/2014    Cambridge et al.
8,886,258 B2    11/2014   Alameh et al.
(Continued)

*Primary Examiner* — Stephen G Sherman
(74) *Attorney, Agent, or Firm* — Cha & Reiter, LLC

(57) ABSTRACT

An electronic device includes: a communication module configured to receive a content; a direction detection unit configured to detect a direction that a screen of the electronic device faces; a control unit configured to determine whether to display the received content on the basis of a least one of whether the received content corresponds to a designated content and whether the detected direction corresponds to a designated direction; and a display module configured to display a notification notifying the reception of the content without displaying the content if the detected direction does not correspond to the designated direction and the received content corresponds to the designated content according to a determination result of the control unit.

19 Claims, 9 Drawing Sheets

(51) Int. Cl.
*G06F 1/16* (2006.01)
*G06F 3/0346* (2013.01)
*G06F 3/0488* (2013.01)
*G06F 3/01* (2006.01)
*G06F 3/03* (2006.01)
*G06F 3/0481* (2013.01)
*G06F 21/00* (2013.01)
*H04M 1/72* (2006.01)

(52) U.S. Cl.
CPC ............ *G06F 3/013* (2013.01); *G06F 3/0304* (2013.01); *G06F 3/0346* (2013.01); *G06F 3/0481* (2013.01); *G06F 3/04883* (2013.01); *G06F 3/14* (2013.01); *G06F 21/00* (2013.01); *H04M 1/72* (2013.01); *G09G 2320/0261* (2013.01); *G09G 2340/0492* (2013.01); *G09G 2354/00* (2013.01); *G09G 2358/00* (2013.01)

(56) References Cited

U.S. PATENT DOCUMENTS

| | | |
|---|---|---|
| 8,988,349 B2 | 3/2015 | Alberth et al. |
| 8,994,653 B2 | 3/2015 | Gardenfors et al. |
| 9,075,451 B2 | 7/2015 | Gardenfors et al. |
| 9,357,272 B2 | 5/2016 | Oyman |
| 2009/0239591 A1 | 9/2009 | Alameh et al. |
| 2013/0222231 A1 | 8/2013 | Gardenfors et al. |
| 2013/0222236 A1 | 8/2013 | Gardenfors et al. |
| 2013/0222271 A1 | 8/2013 | Alberth et al. |
| 2013/0246465 A1 | 9/2013 | Cambridge et al. |
| 2013/0262298 A1 | 10/2013 | Morley |
| 2013/0281164 A1 | 10/2013 | Alameh et al. |
| 2014/0040959 A1 | 2/2014 | Oyman |
| 2015/0026647 A1* | 1/2015 | Park ................... G06F 3/0488 715/863 |
| 2015/0319280 A1 | 11/2015 | Gardenfors et al. |

* cited by examiner

[Fig. 1]
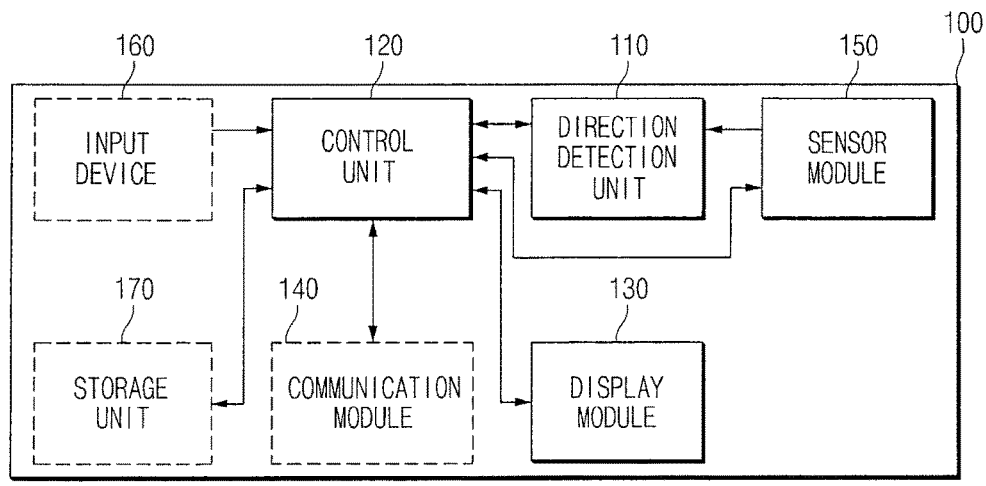
[Fig. 2]
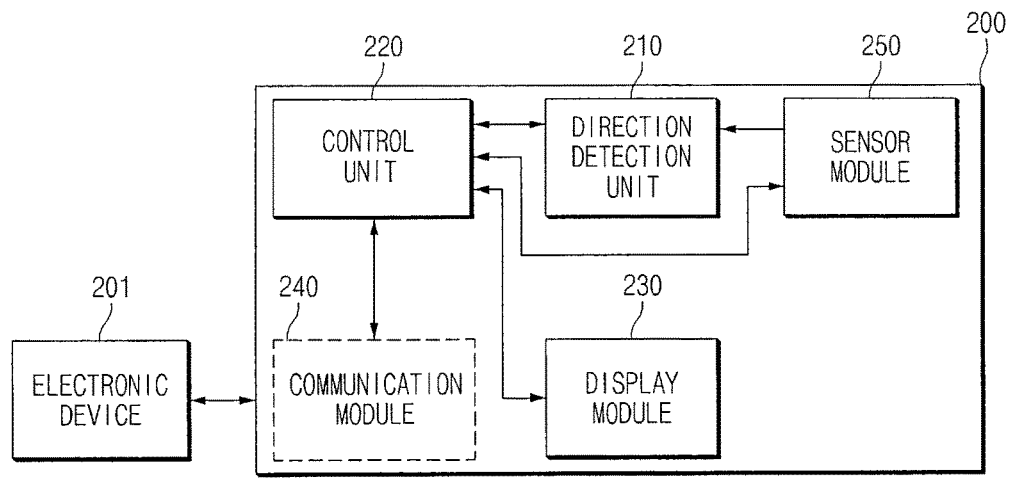

[Fig. 3]
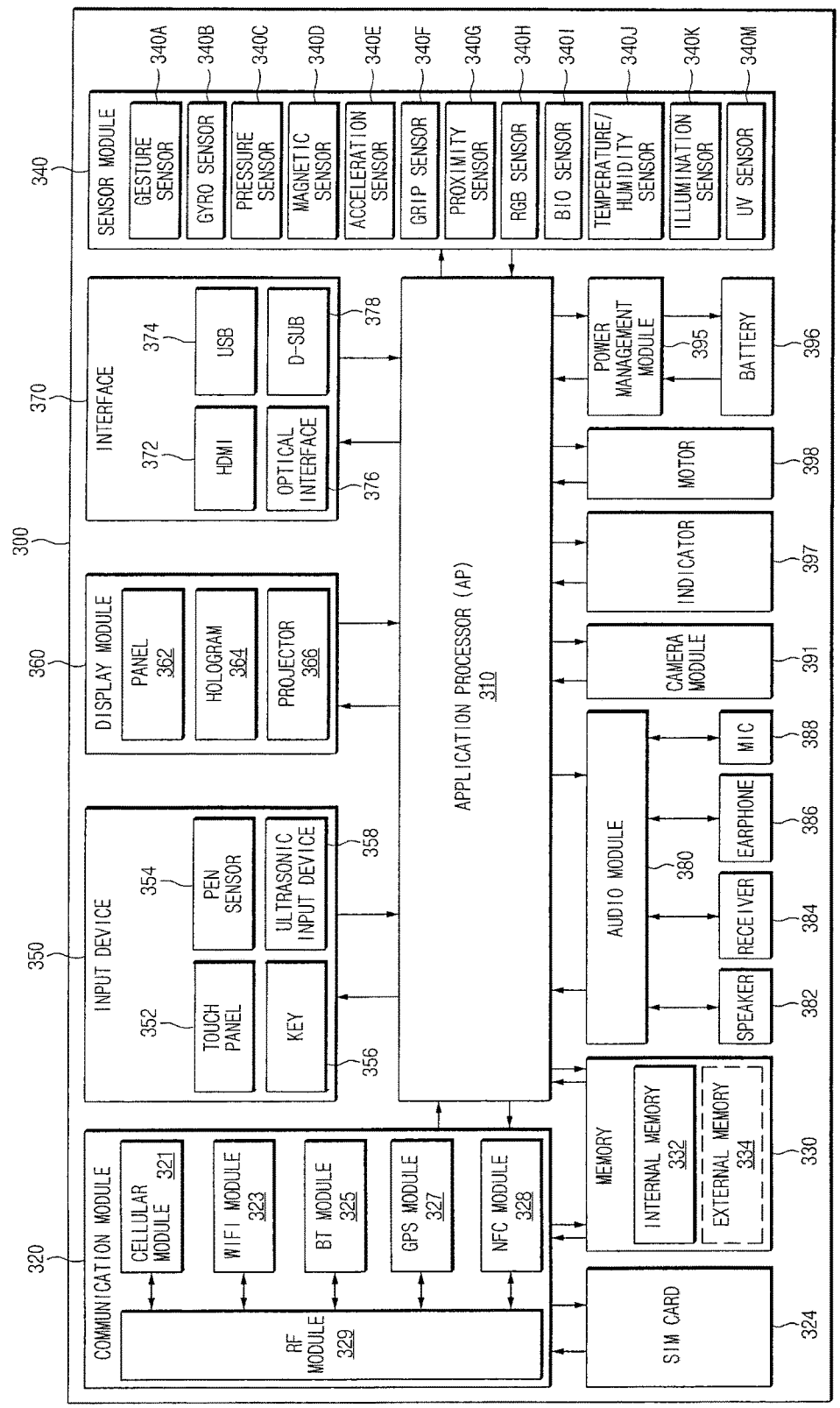

[Fig. 4]
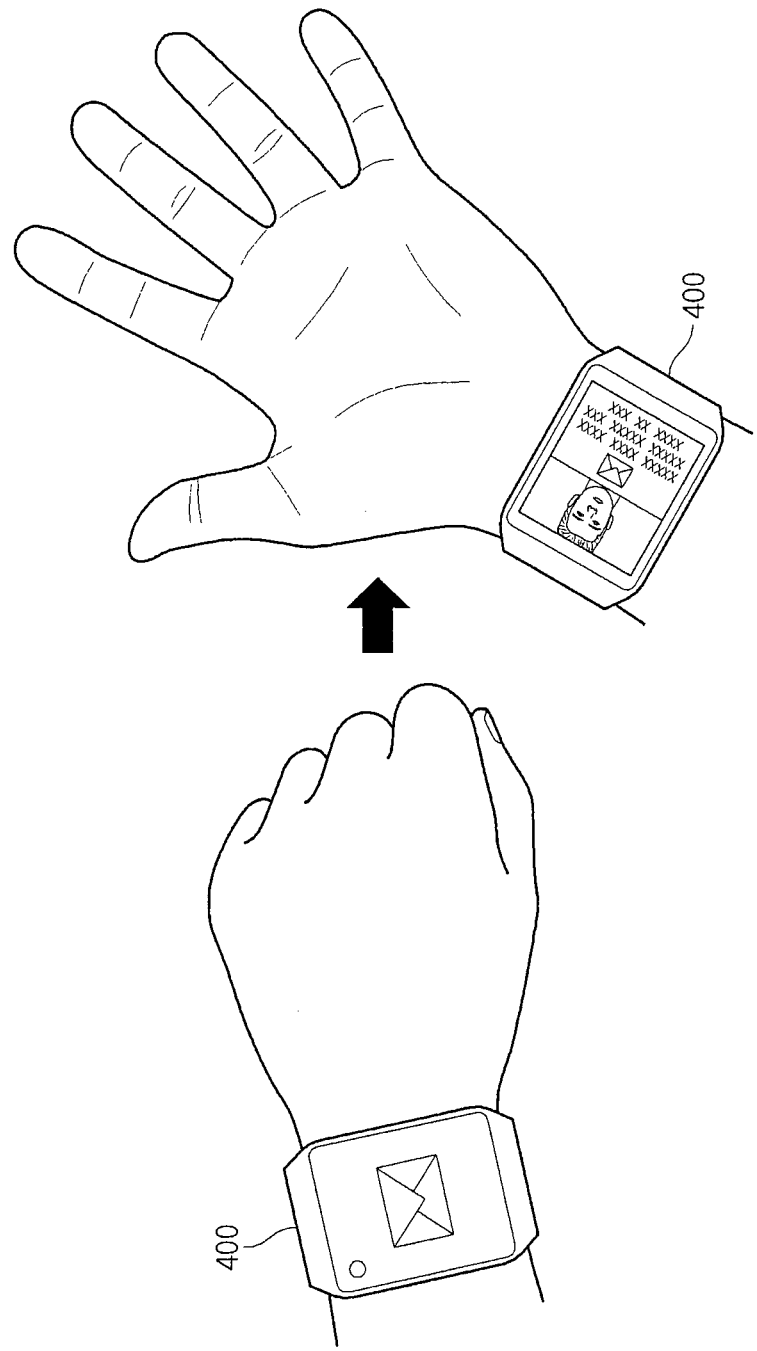

[Fig. 5]
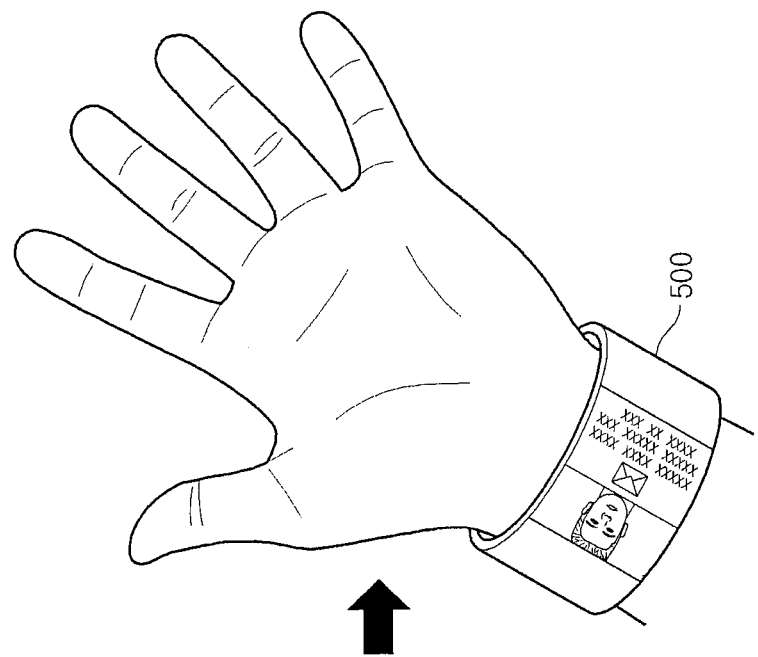
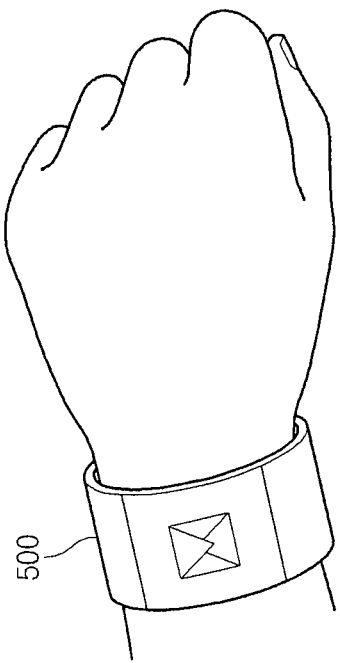

[Fig. 6]
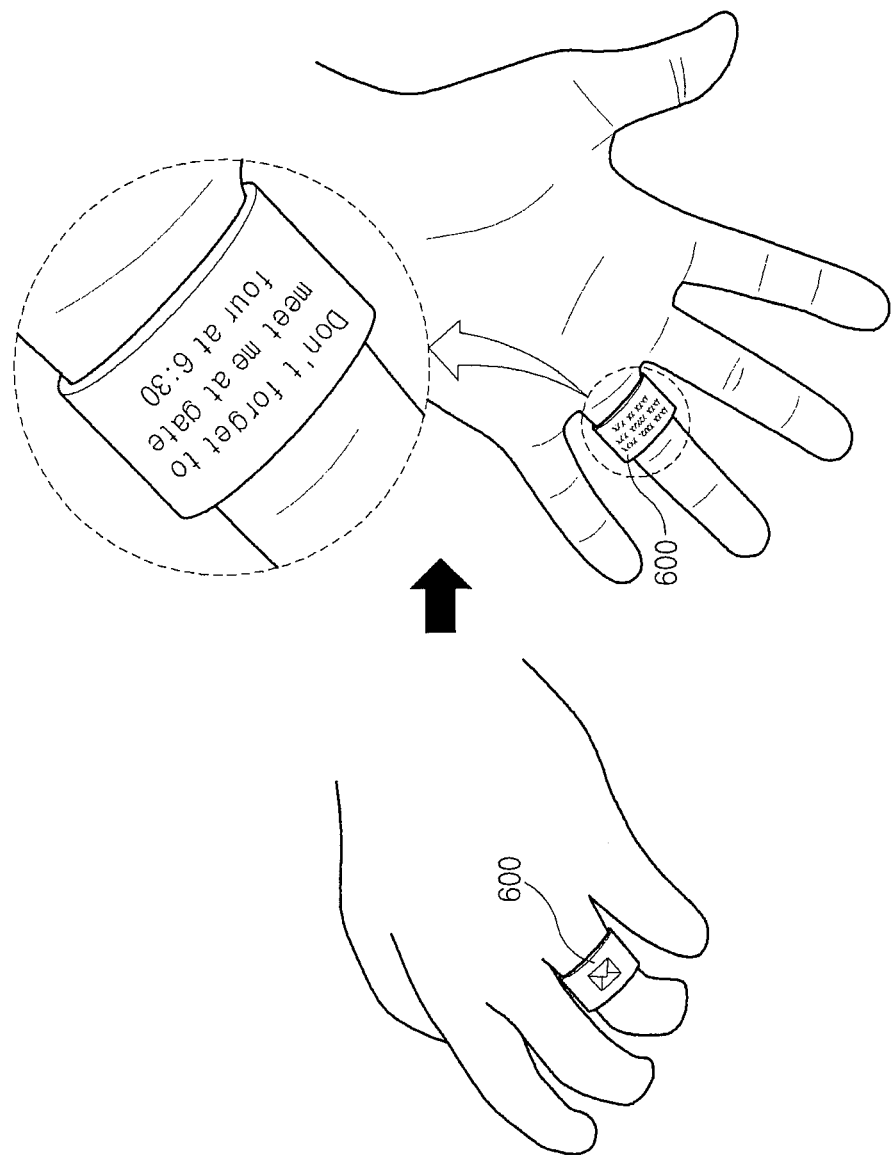

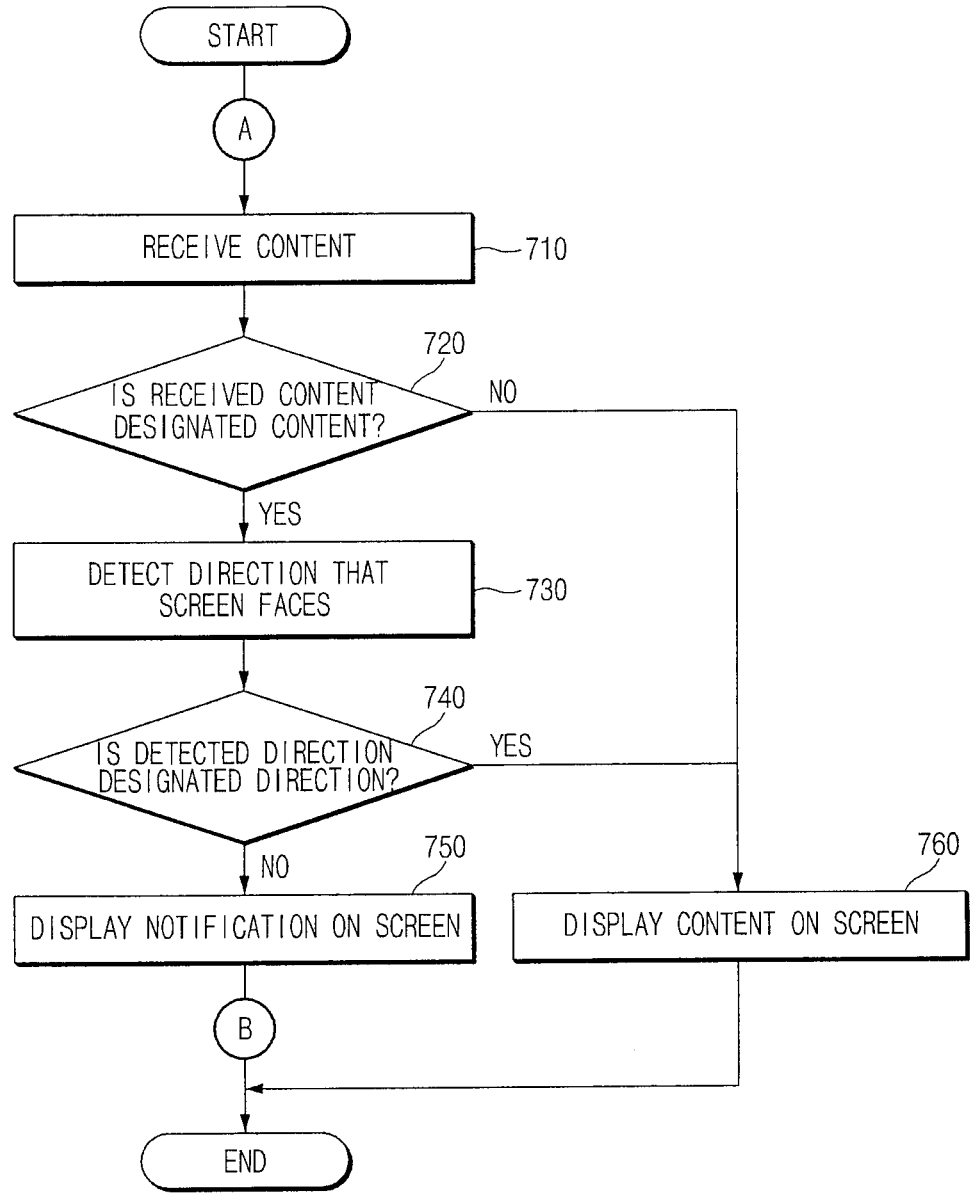
[Fig. 7]

[Fig. 8]
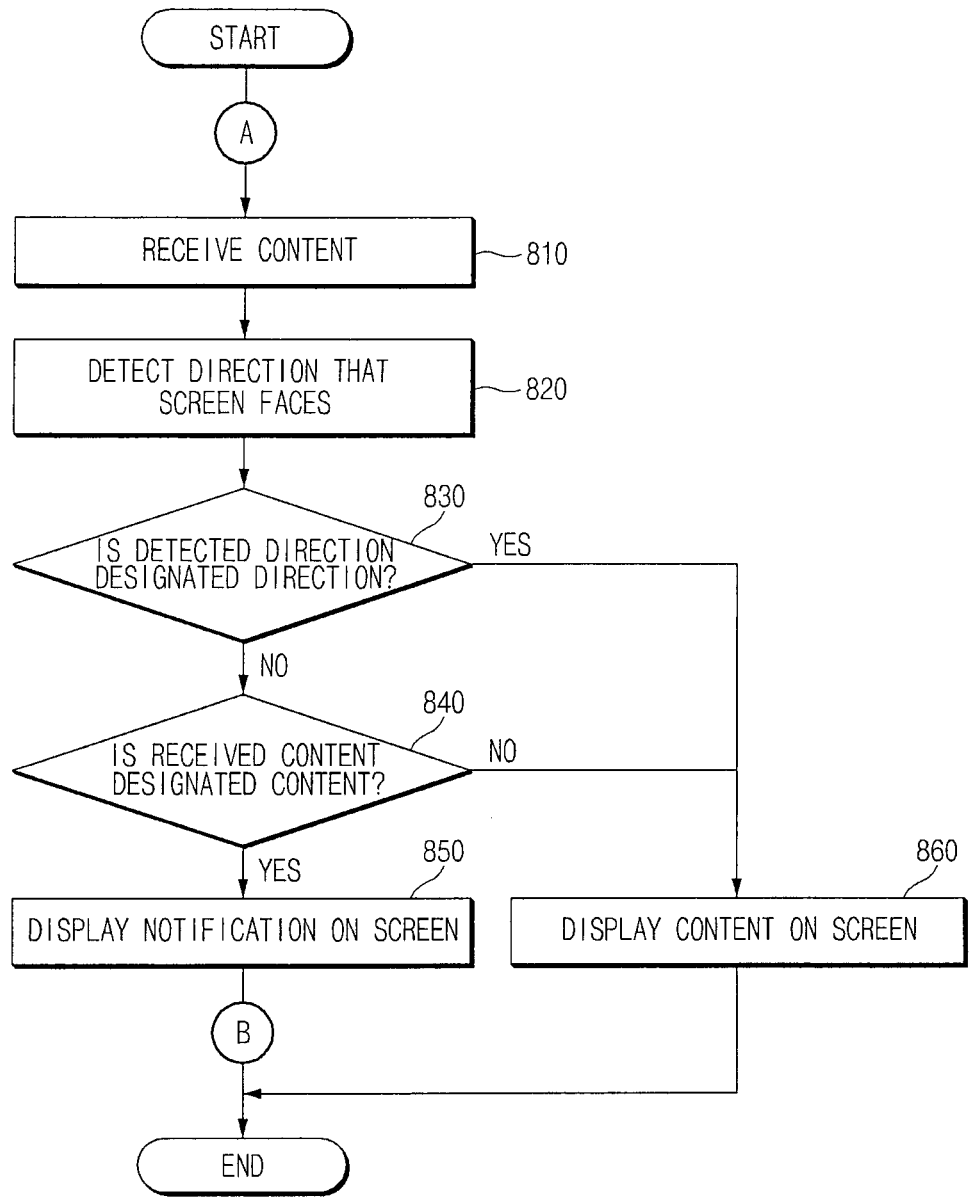

[Fig. 9]
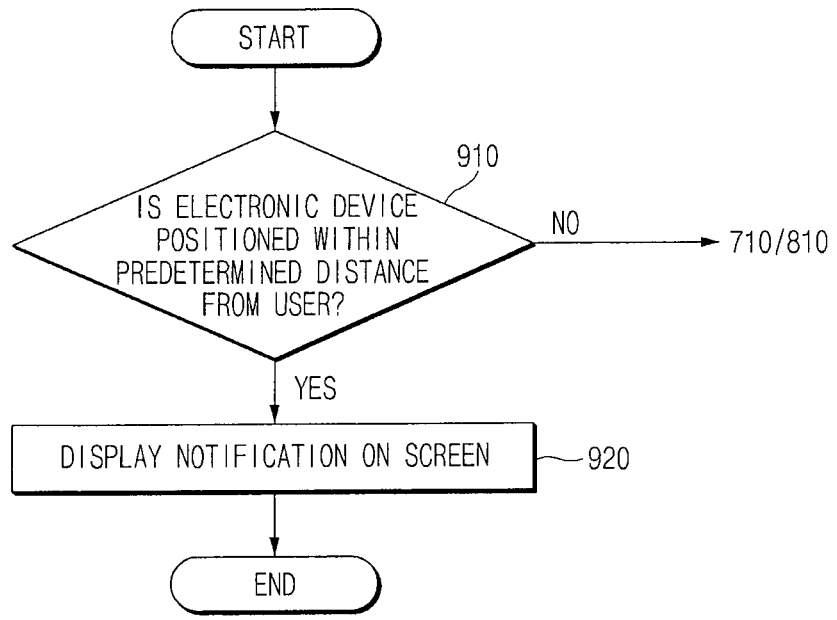
[Fig. 10]
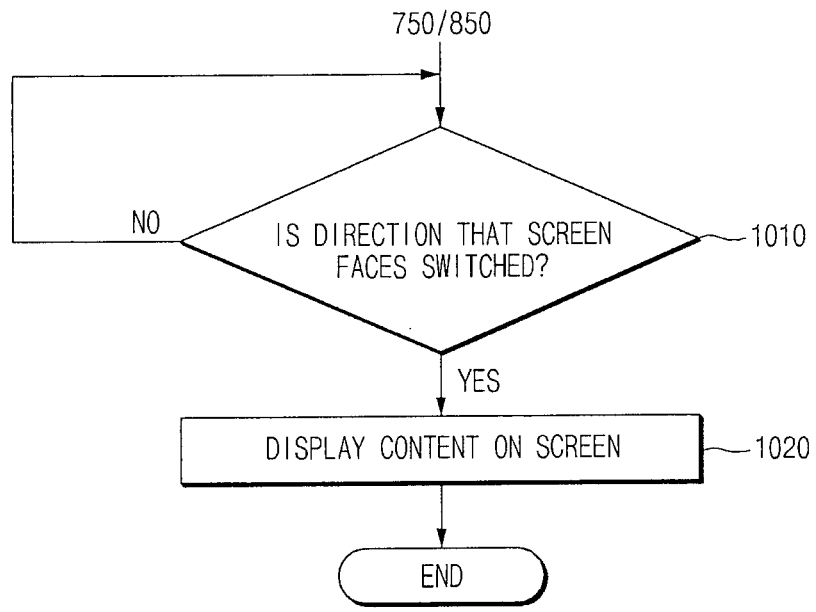

[Fig. 11]
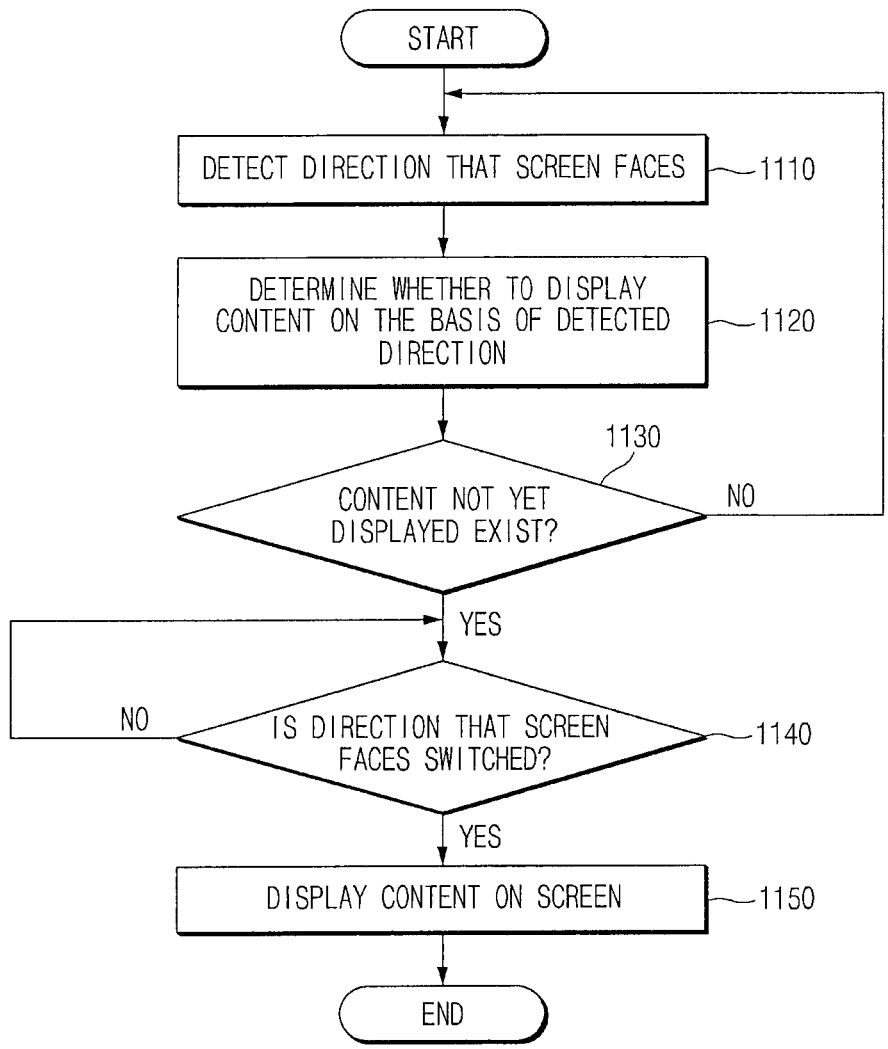

METHOD AND ELECTRONIC DEVICE FOR DISPLAYING CONTENT

CLAIM OF PRIORITY

This application is a National Phase Entry of PCT International Application No. PCT/KR2015/002033, which was filed on Mar. 3, 2015, and claims a priority to Korean Patent Application No. 10-2014-0025592, which was filed on Mar. 4, 2014, the contents of which are incorporated herein by reference.

TECHNICAL FIELD

The priority of Korean patent application No. 10-2014-0025592 filed Mar. 4, 2014, the disclosure of which is hereby incorporated in its entirety by reference, is claimed.

The present invention relates to a method and an electronic device for displaying content.

BACKGROUND ART

Recently, a user interface (UI) and a user experience (UX) have been recognized as interaction between a user and an electronic device, so that preference is increasing for a UI and a UX that give consideration to users and provide a friendly usage environment to users.

DISCLOSURE OF INVENTION

Technical Problem

If a portable terminal such as a smartphone and a wearable device receives a message, a call, or a notification in a public place, people other than the user of the portable terminal may see the screen of the portable terminal. Therefore, the user's personal information may be exposed. Various embodiments of the present invention for solving such technical issues may be provided.

Solution to Problem

Various embodiments of the invention are directed to providing a method and an electronic device for displaying contents. Additionally, a computer readable recording medium having a program recorded thereon to execute the method on a computer is provided. Technical objects implemented by various embodiments of the present invention are not limited to the technical objects and may include other technical objects.

According to an embodiment of the present invention, an electronic device includes: a communication module configured to receive a content; a direction detection unit configured to detect a direction that a screen of the electronic device faces; a control unit configured to determine whether to display the received content on the basis of at least one of whether the received content corresponds to a designated content and whether the detected direction corresponds to a designated direction; and a display module configured to display a notification notifying the reception of the content without displaying the content if the detected direction does not correspond to the designated direction and the received content corresponds to the designated content according to a determination result of the control unit.

According to another embodiment of the present invention, a method of displaying content includes: receiving a content; determining whether the content corresponds to a designated content; if the content corresponds to the designated content, detecting a direction that a screen of an electronic device faces; determining whether the detected direction corresponds to a designated direction; and if the detected direction does not correspond to the designated direction, displaying a notification notifying the reception of the content on the screen.

According to another embodiment of the present invention, a method of displaying content includes: receiving a content; detecting a direction that a screen of an electronic device faces; determining whether the detected direction corresponds to a designated direction; if the detected direction does not correspond to the designated direction, determining whether the received content corresponds to a designated content; and if the content corresponds to the designated content, displaying a notification notifying the reception of the content on the screen.

According to another embodiment of the present invention, provided is a non-transitory computer readable recording medium having a program recorded thereon, which, when executed by a computer, implements the above method.

Advantageous Effects of Invention

Since a determination is made on whether to display the content on the basis of a direction that the screen of the electronic device faces, the exposure of personal information may be prevented from a third person other than a user of the electronic device. If there is a content not yet displayed, since the content is displayed by switching a direction that the screen faces, the convenience of a user may be increased. Moreover, a user-friendly user interface (UI) and user experience (UX) may be provided.

BRIEF DESCRIPTION OF DRAWINGS

FIG. 1 is a block diagram illustrating an electronic device according to an embodiment of the present invention.

FIG. 2 is a block diagram illustrating an electronic device according to an embodiment of the present invention.

FIG. 3 is a block diagram illustrating an electronic device according to an embodiment of the present invention.

FIG. 4 is a view illustrating a method of displaying content in an electronic device according to an embodiment of the present invention.

FIG. 5 is a view illustrating a method of displaying content in an electronic device according to an embodiment of the present invention.

FIG. 6 is a view illustrating a method of displaying content in an electronic device according to an embodiment of the present invention.

FIG. 7 is a flowchart illustrating a method of displaying content in an electronic device according to an embodiment of the present invention.

FIG. 8 is a flowchart illustrating a method of displaying content in an electronic device according to an embodiment of the present invention.

FIG. 9 is a flowchart illustrating a method of displaying content in an electronic device according to an embodiment of the present invention.

FIG. 10 is a flowchart illustrating a method of displaying content in an electronic device according to an embodiment of the present invention.

FIG. 11 is a flowchart illustrating a method of displaying content in an electronic device according to an embodiment of the present invention.

MODE FOR THE INVENTION

Hereinafter, embodiments of the present invention will be described in more detail with reference to the accompanying drawings. Various embodiments of the present invention are shown in the drawings and related details are described but various modifications are possible and more embodiments may be introduced. Thus, it is intended that the present invention covers the modifications and variations of this invention provided they come within the scope of the appended claims and their equivalents. With respect to the descriptions of the drawings, like reference numerals refer to like elements.

The term "include," "comprise," "including," or "comprising," specifies a property, a region, a fixed number, a step, a process, an element and/or a component but does not exclude other properties, regions, fixed numbers, steps, processes, elements and/or components. The meaning of "include," "comprise," "including," or "comprising," specifies a property, a region, a fixed number, a step, a process, an element and/or a component but does not exclude other properties, regions, fixed numbers, steps, processes, elements and/or components.

In this specification, the expression "or" includes any or all combinations of words listed. For example, "A or B" may include A or include B or include both A and B.

The terms 'first' and/or 'second' may be used to describe various elements; however, the elements should not be limited by these terms. For example, the above expressions do not limit the order and/or importance of corresponding components. The expressions are used to distinguish one component from another component. For example, a first user device and a third user device are all user devices and represent different user devices. For example, a first component may be referred to as a second component and vice versa without departing from the scope of the present invention.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Terms used in this specification are used to describe specific embodiments, and are not intended to limit the scope of the present invention. The terms of a singular form may include plural forms unless they have a clearly different meaning in the context.

Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning.

Additionally, an electronic device according to an embodiment of the present invention may be a device having a communication function. For example, an electronic device may include at least one of smartphones, tablet personal computers (PCs), mobile phones, video phones, e-book readers, desktop PCs, laptop PCs, netbook computers, personal digital assistants (PDAs), portable multimedia players (PMPs), MP3 players, mobile medical equipment, cameras, or wearable devices (for example, head-mounted-devices (HMDs) such as electronic glasses, electronic clothing, electronic bracelets, electronic necklaces, appcessories, electronic tattoos, or smart watches).

According to an embodiment of the present invention, an electronic device may be a smart home appliance having a communication function. The smart home appliance, for example, an electronic device, may include at least one of televisions, digital video disk (DVD) players, audio systems, refrigerators, air conditioners, vacuum cleaners, ovens, microwaves, washing machines, air purifiers, set-top boxes, TV boxes (for example, the Samsung HomeSync™, Apple TV™, or Google TV™), game consoles, electronic dictionaries, electronic key, camcorders, or electronic frames.

According to an embodiment of the present invention, an electronic device may include at least one of various medical devices (for example, magnetic resonance angiography (MRA) devices, magnetic resonance imaging (MRI) devices, computed tomography (CT) devices, medical imaging devices, ultrasonic devices, etc.), navigation devices, global positioning system (GPS) receivers, event data recorders (EDRs), flight data recorders (FDRs), vehicle infotainment devices, marine electronic equipment (for example, marine navigation systems, gyro compasses, etc.), avionics, security equipment, car head units, industrial or household robots, financial institutions' automatic teller's machines (ATMs), and stores' point of sales (POS).

According to embodiments of the present invention, an electronic device may include at least one of part of furniture or buildings/structures having a communication function, electronic boards, electronic signature receiving devices, projectors, or various measuring instruments (for example, water, electricity, gas, or radio signal measuring instruments). An electronic device according to an embodiment of the present invention may be one of the above-mentioned various devices or a combination thereof. Additionally, an electronic device according to an embodiment of the present invention may be a flexible device. Furthermore, it is apparent to those skilled in the art that an electronic device according to an embodiment of the present invention is not limited to the above-mentioned devices.

Hereinafter, embodiments of the present invention will be described in more detail with reference to the accompanying drawings. The term "user" in various embodiments may refer to a person using an electronic device or a device using an electronic device (for example, an artificial intelligent electronic device).

FIG. 1 is a block diagram illustrating an electronic device according to an embodiment of the present invention.

Referring to FIG. 1, the electronic device 100 may be configured with a direction detection unit 110, a control unit 120, and a display module 130. According to various embodiments of the present invention, the electronic device 100 may further include at least one of a communication module 140, a sensor module 150, an input device 160, and a storage unit 170.

In this specification, only the components relating to this embodiment are described in order not to obscure the features of this embodiment. Accordingly, it is apparent to those skilled in the art that other general components in addition to components shown in FIG. 1 may be further included.

The electronic device 100 may be a stand-alone electronic device. The electronic device 100 may determine whether a received content corresponds to a designated content and whether to display a content according to a direction that the screen of the electronic device 100 faces. The direction detection unit 110 detects a direction that the screen of the electronic device 100 faces. The direction detection unit 110 may identify a direction that the screen faces by using at least one sensor.

According to an embodiment of the present invention, if the electronic device 100 corresponds to a wearable device having a flexible display, the direction detection unit 110 may determine a direction that the screen faces on the basis of a direction that a portion of the screen in an active in the flexible display screen faces. This will be described in more detail with reference to FIG. 5.

For example, the direction detection unit 110 may detect a direction that the screen faces by using at least one of a camera, a bio sensor, an artery sensor, a skeleton recognition sensor, a geomagnetic sensor, a gyro sensor, a touch sensor, and an infrared ray (IR) sensor. At least one sensor according to an embodiment of the present invention is not limited to the above listed sensors and may include any sensors used for distinguishing a direction that a screen faces.

According to an embodiment of the present invention, if the electronic device 100 corresponds to a mobile terminal, the direction detection unit 110 may detect a direction that the screen of the electronic device 100 faces by using at least one of a camera, a geomagnetic sensor, a gyro sensor, and a touch sensor in the electronic device 100.

According to another embodiment of the present invention, if the electronic device 100 corresponds to a wearable device equipped around a predetermined body part, the direction detection unit 110 may detect a direction that the screen faces by using at least one of a bio sensor, an artery recognition sensor, a skeleton recognition sensor, an IR sensor, and a touch sensor in the electronic device 100.

The direction detection unit 110 may determine whether the detected direction corresponds to a designated direction. For example, the designated direction may be a direction that screens the eyes of a person other than a user of the electronic device 100.

According to an embodiment of the present invention, if the electronic device 100 corresponds to a wearable device, as the wearable device is worn, the designated direction may be a direction that screens the eyes of a person other than a user of the electronic device 100. For example, if the electronic device 100 is a wearable device wrapped on a predetermined body part, the designated direction is a direction that designates the screen of the wearable device to be positioned inside the body part. When a user wears various wearable devices (for example, head-mounted-devices (HMDs) such as electronic eyeglasses, electronic clothes, electronic bracelets, electronic necklaces, electronic appcessories, electronic tattoos, smart watches, smart bands, or smart rings), the designated direction may vary according to methods or positions for wearing a wearable device.

For example, if the electronic device 100 corresponds to a smart watch or band worn on a wrist, the designated direction may be a wrist inward direction. When the smart watch or band is worn, as the screen is positioned in a wrist outward direction, a third person other than a user of the electronic device 100 may view the screen easily. On the other hand, as the screen of the smart watch or band is positioned in a wrist inward direction, other people are hard to see or recognize the screen of the electronic device 100. This will be described in more detail with reference to FIGS. 4 and 5.

For another example, if the electronic device 100 corresponds to a smart ring worn on a finger, the designated direction may be a finger inward direction (opposite direction against a nail). When the smart ring is worn, as the screen is positioned in a finger outward direction, a third person other than a user of the electronic device 100 may view the screen easily. On the other hand, as the screen of the smart ring is positioned in a wrist inward direction, the eyes of a person other than a user of the electronic device 100 may be screened. This will be described in more detail with reference to FIG. 6.

The control unit 120 determines whether to display content on the basis of at least one of whether the received content corresponds to a designated content and whether the detected direction corresponds to a designated direction.

According to a determination result of the control unit 120, if the detected direction does not correspond to the designated direction and the received content corresponds to the designated content, without displaying the content, the display module 130 may be controlled to display a notification notifying the reception of the content on the screen.

According to an embodiment of the present invention, if the received content corresponds to the designated content, the control unit 120 may control the direction detection unit 110 to detect a direction that the screen faces and if the received content does not correspond to the designated content, the control unit 120 may control the display module 130 to display the received content on the screen. If the received content corresponds to the designated content and the detected direction corresponds to the designated direction, the control unit 120 may control the display module 130 to display the received content on the screen of the electronic device 100. On the other hand, if the detected direction does not correspond to the designated direction, without displaying the content, the control unit 120 may control the display module 130 to display a notification notifying the reception of the content on the screen.

According to another embodiment of the present invention, if the detected direction does not correspond to the designated direction, the control unit 120 may determine whether the received content corresponds to the designated content and if the detected direction corresponds to the designated direction, the control unit 120 may control the display module 130 to display the received content on the screen. If the detected direction does not correspond to the designated direction and the received content does not correspond to the designated content, the control unit 120 may control the display module 130 to display the received content on the screen. On the other hand, if the received content corresponds to the designated content, without displaying the content, the control unit 120 may control the display module 130 to display a notification notifying the reception of the content on the screen.

According to an embodiment of the present invention, if the content corresponds to the designated content, the control unit 120 may determine whether to display content according to a direction that the screen faces. For example, the designated content may include personal content such as a message, a notification, and a call. The designated content may be a content set by default to the electronic device 100 or a content set by a user through the input device 160 of the electronic device 100. A user may set the designated content in the electronic device 100 through the input device 160. Or, a user may set the designated content in the electronic device 100 through voice input. The remaining contents except the designated content are classified as general contents, so that they may be displayed on the display module 130 regardless of a direction that a screen faces.

According to an embodiment of the present invention, a user may separately designate the received contents as personal contents or general contents by each app or each function, for example, a message, a notification, and a call.

According to another embodiment of the present invention, a user may separately designate the received contents as personal contents or general contents according to a recipient in one app or a parsing result of message content. For example, if a specific text is included in the content of a received message, the control unit 120 may automatically determine that the received message corresponds to personal content.

Once a content is received, the control unit 120 may recognize the category of the received content by utilizing a content category classification or tagging technique. The control unit 120 may determine whether a received content corresponds to a designated content. If the received content corresponds to the designated content, the control unit 120 may determine whether to display content according to a direction that the screen faces.

According to another embodiment of the present invention, if the electronic device 100 is out of a predetermined distance from a user, the control unit 120 may control the display module 130 not to display the content regardless of a direction that the screen of the electronic device 100 faces. For example, when a user does not hold the electronic device 100, or the electronic device 100 corresponds to a wearable device and a user does not wear the wearable device, a content may be exposed regardless of a direction that the screen faces. The control unit 120 may determine whether the electronic device 100 is positioned within a predetermined distance from a user.

The predetermined distance is a distance determined as that a user does not use the electronic device 100. The predetermined distance may vary according to a type of the electronic device 100. For example, if the electronic device 100 corresponds to a portable terminal, the control unit 120 may determine whether the electronic device 100 is positioned within a predetermined distance from a user by using at least one sensor of a touch sensor, a grip sensor, a proximity sensor, or a camera of the electronic device 100. According to another embodiment of the present invention, if the electronic device 100 corresponds to a wearable device, the control unit 120 may determine whether the electronic device 100 is positioned within a predetermined distance from a user, that is, whether a user wears the wearable device, by using at least one sensor.

When a direction that the screen faces switches into the designated direction, the control unit 120 may control the display module 130 to display the content on the screen. In the electronic device 100, the direction that the screen faces may be switched by at least one of user's touch, drag, and gesture on the screen and a rotation of the electronic device 100. This will be described in more detail with reference to FIGS. 4 and 5.

When the received content corresponds to a designated content and a direction that the screen of the electronic device 100 faces corresponds to a designated direction, the display module 130 displays the received content on the screen. If a direction that the screen of the electronic device 100 faces does not correspond to a designated direction, without displaying the content, the display module 130 may display a notification notifying the reception of the content in a visual format. For example, the visual format may include a still image, a dynamic image, and a light blinking Additionally, while there is a content not yet displayed, as a direction that the screen faces switches, the display module 130 may display the received content on the screen.

Or, the display module 130 may not display the content if the electronic device 100 is out of a predetermined distance from a user.

The display module 130 displays output information processed in the electronic device 100. For example, the display module 130 may include both a display device (for example, a touch screen, a liquid crystal display (LCD), a thin film transistor-LCD (TFT-LCD), an organic light-emitting diode (OLED), a flexible display, and a 3D display) and a software module for driving it.

The communication module 140 receives a content. The communication module 140 may transmit/receive data through a wired/wireless network or a wired serial communication. At this point, network may include Internet, Local Area Network (LAN), Wireless Local Area Network (LAN), Wide Area Network (WAN), and Personal Area Network (PAN) but is not limited thereto. It is apparent to those skilled in the art that there are various kinds of networks.

Additionally, the communication module 140 may transmit/receive data through short range communication techniques. The short range communication techniques may include Bluetooth, Radio Frequency Identification (RFID), infrared Data Association (IrDA), Ultra Wideband (UWB), ZigBee, Wi-Fi Direct (WFD), and Near Field Communication (NFC).

The sensor module 150 may detect a direction that the screen faces, a screen touch, drag, or gesture, or a rotation of the electronic device 100. The sensor module 150 may include at least one of a camera, a bio sensor, an artery recognition sensor, a skeleton recognition sensor, a geomagnetic sensor, a gyro sensor, an acceleration sensor, a gesture sensor, a proximity sensor, a grip sensor, a touch sensor, and an IR sensor. The sensor module 150 is not limited to the above listed sensors and may include all sensors used for detecting a direction that the screen faces, a screen touch, drag, or gesture, or a rotation of the electronic device 100. Additionally, the sensor module 150 may further include a control circuit for controlling the at least one sensor.

The input device 160 receives input information inputted by a user. The input device 160 may receive a content that is to be designated as the personal content, from a user. According to an embodiment of the present invention, the input device 160 may distinguish personal contents from general contents by each app or each function, for example, a message, a notification, and a call, and may receive them from a user.

According to another embodiment of the present invention, the input device 160 may distinguish personal contents from general contents and may receive them from a user according to a recipient. Or, the input device 160 may receive a specific text from a user and may then store a content including the specific text as the personal content. For example, if a specific text is included in the content of a message received according to a parsing result of the message content, the control unit 120 may automatically determine that the received message corresponds to personal content. Further, in order to switch a direction that the screen faces, the input device 160 may receive screen's touch, drag, and gesture.

The user interface 150 may include both an input device (for example, a key pad, a dome switch, a touch pad (resistive/capacitive), a jog wheel, a jog switch, and a H/W button) and a software module for driving it.

The storage unit 170 may store the designated content. The storage unit 170 may store separately the content as a personal content or a general content. The storage unit 170 may store a program routine or instruction set for determining whether content corresponds to a designated content. Additionally, the storage unit 170 may detect a direction that the screen faces or a touch input such as a screen's touch, drag, or gesture and may store data or programs necessary for controlling the display module 130 according to a touch input. Besides that, the storage unit 170 may store data or programs necessary for an operation of the electronic device 100. The storage unit 170 may be implemented with Hard Disk Drive (HDD), Read Only Memory (ROM), Random Access Memory (RAM), Flash Memory, Memory Card, NAND memory, and Solid State Drive (SDD).

FIG. 2 is a block diagram illustrating an electronic device according to an embodiment of the present invention.

Referring to FIG. 2, the electronic device 200 may be configured with a direction detection unit 210, a control unit 220, and a display module 230. According to various embodiments of the present invention, the electronic device 200 may further include at least one of a communication module 240 and a sensor module 250.

The direction detection unit 110, the display module 130, and the sensor module 150 in FIG. 1 may respectively correspond to the direction detection unit 210, the display module 230, and the sensor module 250 in FIG. 2. Accordingly, descriptions relating to the direction detection unit 110, the display module 130, and the sensor module 150 in FIG. 1 may be respectively applied to the direction detection unit 210, the display module 230, and the sensor module 250 in FIG. 2. In this regard, overlapping descriptions are omitted.

In this specification, only the components relating to this embodiment are described in order not to obscure the features of this embodiment. Accordingly, it is apparent to those skilled in the art that other general components in addition to components shown in FIG. 2 may be further included.

Unlike the electronic device 100 shown in FIG. 1, the electronic device 200 may be a companion device driven in linkage with another electronic device 201. For example, the electronic device 200 may be a wearable device that is not able to be driven without a linkage with a main device among wearable devices.

The electronic device 200 may determine whether to display a content according to a direction that the screen of the electronic device 200 faces. The direction detection unit 210 detects a direction that the screen of the electronic device 200 faces. The direction detection unit 210 may identify a direction that the screen faces by using at least one sensor.

The control unit 220 determines whether to display content on the basis of at least one of whether the received content corresponds to a designated content and whether the detected direction corresponds to a designated direction.

According to a determination result of the control unit 220, if the detected direction does not correspond to the designated direction and the received content corresponds to the designated content, without displaying the content, the display module 230 may be controlled to display a notification notifying the reception of the content on the screen.

According to an embodiment of the present invention, if the received content corresponds to the designated content, the control unit 220 may control the direction detection unit 210 to detect a direction that the screen faces and if the received content does not correspond to the designated content, the control unit 220 may control the display module 230 to display the received content on the screen. If the received content corresponds to the designated content and the detected direction corresponds to the designated direction, the control unit 220 may control the display module 230 to display the received content on the screen of the electronic device 200. On the other hand, if the detected direction does not correspond to the designated direction, without displaying the content, the control unit 220 may control the display module 230 to display a notification notifying the reception of the content on the screen.

According to another embodiment of the present invention, if the detected direction does not correspond to the designated direction, the control unit 220 may determine whether the received content corresponds to the designated content and if the detected direction corresponds to the designated direction, the control unit 220 may control the display module 230 to display the received content on the screen. If the detected direction does not correspond to the designated direction and the received content does not correspond to the designated content, the control unit 220 may control the display module 230 to display the received content on the screen. On the other hand, if the received content corresponds to the designated content, without displaying the content, the control unit 220 may control the display module 230 to display a notification notifying the reception of the content on the screen.

When a direction that the screen faces switches into the designated direction, the control unit 220 may control the display module 230 to display the content on the screen. In the electronic device 200, the direction that the screen faces may be switched by at least one of user's touch, drag, and gesture on the screen and a rotation of the electronic device 200.

According to an embodiment of the present invention, if the electronic device 200 is out of a predetermined distance from a user, the control unit 220 may control the display module 230 not to display the content regardless of a direction that the screen of the electronic device 200 faces. The predetermined distance is a distance determined as that a user does not use the electronic device 200. The predetermined distance may vary according to a type of the electronic device 200. The control unit 220 may determine whether the electronic device 200 is positioned within a predetermined distance from a user by using at least one sensor.

According to another embodiment of the present invention, if the received content corresponds to the designated content, the control unit 220 may determine whether to display content according to a direction that the screen faces. The other electronic device 201 may determine whether the received content corresponds to the designated content and the control unit 220 may receive a determination result from the other electronic device 201 through the communication module 240. The other electronic device 201 may recognize the category of the received content by utilizing a content category classification or tagging technique.

The designated content may be a content set by default to the other electronic device 201 or a content set by a user through the input device of the other electronic device 201. For example, the designated content may include personal content such as a message, a notification, and a call. According to an embodiment of the present invention, a user may distinguish personal contents from general contents by each app or each function, for example, a message, a notification, and a call. According to another embodiment of the present invention, a user may separately designate the received contents as personal contents or general contents according to a recipient in one app or a parsing result of message content. For example, if a specific text is included in the content of a received message, the control unit 220 may automatically determine that the received message corresponds to personal content.

When the received content corresponds to a designated content and a direction that the screen of the electronic device 200 faces corresponds to a designated direction, the display module 230 displays the received content on the screen. If a direction that the screen of the electronic device 200 faces does not correspond to a designated direction, without displaying the content, the display module 230 may display a notification notifying the reception of the content in a visual format. While there is a content not yet displayed, as a direction that the screen faces switches, the display module 230 may display the content on the screen.

Or, the display module 230 may not display the content if the electronic device 200 is out of a predetermined distance from a user.

The communication module 240 receives content. The communication module 240 may transmit/receive data through a wired/wireless network or a wired serial communication. At this point, network may include LAN, WLAN, WAN, and PAN but is not limited thereto. It is apparent to those skilled in the art that there are various kinds of networks.

Additionally, the communication module 240 may operate in a functional linkage with the other electronic device 201 through short range communication techniques. The communication module 240 may transmit/receive data through short range communication techniques. The short range communication techniques may include Bluetooth, RFID, IrDA, UWB, ZigBee, WFD, and NFC.

The sensor module 250 may detect a direction that the screen faces, a screen touch, drag, or gesture, or a rotation of the electronic device 200. The sensor module 250 may include at least one of a camera, a bio sensor, an artery recognition sensor, a skeleton recognition sensor, a geomagnetic sensor, a gyro sensor, an acceleration sensor, a gesture sensor, a proximity sensor, a grip sensor, a touch sensor, and an IR sensor.

The other electronic device 201 operates in a functional linkage with the electronic device 200. The other electronic device 201 may determine whether a received content corresponds to the designated content and may then transmit a determination result to the electronic device 200.

A user may set the designated content in the other electronic device 201 through the input device therein. Or, a user may set the designated content in the other electronic device 201 through voice. The remaining content other than the designated content is classified as general content.

Once content is received, the other electronic device 201 may recognize the category of the received content by utilizing a content category classification or tagging technique. The other electronic device 201 may determine whether a received content corresponds to a designated content. The other electronic device 201 may transmit the determination result to the electronic device 200. The electronic device 200 may determine whether to display content according to a direction that the screen faces on the basis of the determination result received from the other electronic device 201.

FIG. 3 is a block diagram illustrating an electronic device according to an embodiment of the present invention.

Referring to FIG. 3, the electronic device 300 includes at least one application processor (AP) 310, a communication module 320, a subscriber identification module (SIM) card 324, a memory 330, a sensor module 340, an input device 350, a display module 360, an interface 370, an audio module 380, a camera module 391, a power management module 395, a battery 396, an indicator 397, and a motor 398.

The AP 310 may control a plurality of hardware or software components connected to the AP 310 and also may perform various data processing and operations with multimedia data by executing an operating system or an application program. The AP 310 may be implemented with a system on chip (SoC), for example. According to an embodiment of the present invention, the AP 310 may further include a graphic processing unit (GPU) (not shown).

The AP 310 may include a direction detection unit and a control unit. The direction detection unit and the control unit may respectively correspond to the direction detection unit and the control unit shown in FIG. 1. Hereinafter, descriptions relating to the direction detection unit and the control unit shown in FIG. 1 may be respectively applied to the direction detection unit and the control unit shown in FIG. 3.

The direction detection unit may detect a direction that the screen of the electronic device 300 faces on the basis of sensor data obtained from the sensor module 340. According to an embodiment of the present invention, if the electronic device 300 corresponds to a wearable device having a flexible display screen, the direction detection unit may determine a direction that the screen faces on the basis of a direction that a screen in an active in the flexible display screen faces.

The control unit determines whether to display the received content on the basis of at least one of whether the received content corresponds to a designated content and whether the detected direction corresponds to a designated direction.

According to a determination result of the control unit, if the detected direction does not correspond to the designated direction and the received content corresponds to the designated content, without displaying the content, the display module 360 may be controlled to display a notification notifying the reception of the content on the screen.

According to an embodiment of the present invention, if the received content corresponds to the designated content, the control unit may control the direction detection unit to detect a direction that the screen faces and if the received content does not correspond to the designated content, the control unit may control the display module 360 to display the received content on the screen. If the received content corresponds to the designated content and the detected direction corresponds to the designated direction, the control unit may control the display module 360 to display the received content on the screen of the electronic device 300. On the other hand, if the detected direction does not correspond to the designated direction, without displaying the content, the control unit may control the display module 360 to display a notification notifying the reception of the content on the screen.

According to another embodiment of the present invention, if the detected direction does not correspond to the designated direction, the control unit may determine whether the received content corresponds to the designated content and if the detected direction corresponds to the designated direction, the control unit may control the display module 360 to display the received content on the screen. If the detected direction does not correspond to the designated direction and the received content does not correspond to the designated content, the control unit may control the display module 360 to display the received content on the screen. On the other hand, if the received content corresponds to the designated content, without displaying the content, the control unit may control the display module 360 to display a notification notifying the reception of the content on the screen.

Once content is received through the communication module 320, the control unit may determine whether the received content corresponds to a designated content. For example, the control unit 120 may recognize the category of the received content by utilizing a content category classification or tagging technique. If the received content corresponds to the designated content, the control unit may determine whether to display content according to a direction that the screen faces. Additionally, the control unit may set a designated content in the electronic device 300 through the input device 350 or the mic (microphone) 388 of the electronic device 300.

After the notification is displayed, the control unit controls the direction detection unit to detect a direction that the screen faces and when a direction that the screen faces switches into the designated direction, the control unit may control the display module 360 to display the content on the screen.

Or, if the electronic device 300 is out of a predetermined distance from a user, the control unit may control the display module 360 not to display the content regardless of a direction that the screen of the electronic device 300 faces.

The communication module 320 receives the content. The communication module 320 may perform data transmission through a communication between other electronic devices connected to the electronic device 300 via a network. According to an embodiment of the present invention, the communication module 320 may include a cellular module 321, a Wifi module 323, a Bluetooth (BT) module 325, a Global Positioning System (GPS) module 327, a Near Field Communication (NFC) module 328, and a radio frequency (RF) module 329.

The cellular module 321 may provide voice calls, video calls, text services, or internet services through a communication network (for example, LTE, LTE-A, CDMA, WCDMA, UMTS, WiBro, or GSM). Additionally, the cellular module 321 may distinguish and authenticate an electronic device in a communication network by using a subscriber identification module (for example, the SIM card 324), for example. According to an embodiment of the present invention, the cellular module 321 may perform at least part of a function that the AP 310 provides. For example, the cellular module 321 may perform at least part of a multimedia control function.

According to an embodiment of the present invention, the cellular module 321 may further include a communication processor (CP). Additionally, the cellular module 321 may be implemented with SoC, for example. As shown in FIG. 3, components such as the cellular module 321 (for example, a CP), the memory 330, or the power management module 395 are separated from the AP 310, but according to an embodiment of the present invention, the AP 310 may be implemented including some of the above-mentioned components (for example, the cellular module 321).

According to an embodiment of the present invention, the AP 310 or the cellular module 321 (for example, a CP) may load instructions or data, which are received from a nonvolatile memory or at least one of other components connected thereto, into a volatile memory and then may process them. Furthermore, the AP 310 or the cellular module 321 may store data received from or generated by at least one of other components in a nonvolatile memory.

Each of the Wifi module 323, the BT module 325, the GPS module 327, and the NFC module 328 may include a processor for processing data transmitted/received through a corresponding module. Although the cellular module 321, the Wifi module 323, the BT module 325, the GPS module 327, and the NFC module 328 are shown as separate blocks in FIG. 3, according to an embodiment of the present invention, some (for example, at least two) of the cellular module 321, the Wifi module 323, the BT module 325, the GPS module 327, and the NFC module 328 may be included in one integrated chip (IC) or an IC package. For example, at least some (for example, a CP corresponding to the cellular module 321 and a Wifi processor corresponding to the Wifi module 323) of the cellular module 325, the Wifi module 327, the BT module 328, the GPS module 321, and the NFC module 323 may be implemented with one SoC.

The RF module 329 may be responsible for data transmission, for example, the transmission of an RF signal. Although not shown in the drawings, the RF module 329 may include a transceiver, a power amp module (PAM), a frequency filter, or a low noise amplifier (LNA). Additionally, the RF module 329 may further include components for transmitting/receiving electromagnetic waves on a free space in a wireless communication, for example, conductors or conducting wires. Although the cellular module 321, the Wifi module 323, the BT module 325, the GPS module 327, and the NFC module 328 share one RF module 329 shown in FIG. 3, according to an embodiment of the present invention, at least one of the cellular module 321, the Wifi module 323, the BT module 325, the GPS module 327, and the NFC module 328 may perform the transmission of an RF signal through an additional RF module.

The SIM card 324 may be a card including a subscriber identification module and may be inserted into a slot formed at a specific position of an electronic device. The SIM card 324 may include unique identification information (for example, an integrated circuit card identifier (ICCID)) or subscriber information (for example, an international mobile subscriber identity (IMSI)).

The memory 330 may store the designated content. Additionally, the memory 330 may store a program routine or instruction set for determining whether the content corresponds to a designated content. Additionally, the memory 330 may detect a direction that the screen faces or a touch input such as a screen's touch, drag, or gesture and may store data or programs necessary for controlling the display module 360 according to a touch input.

The memory 330 may include an internal memory 332 or an external memory 334. The internal memory 332 may include at least one of a volatile memory (for example, dynamic RAM (DRAM), static RAM (SRAM), synchronous dynamic RAM (SDRAM)) and a non-volatile memory (for example, one time programmable ROM (OTPROM), programmable ROM (PROM), erasable and programmable ROM (EPROM), electrically erasable and programmable ROM (EEPROM), mask ROM, flash ROM, NAND flash memory, and NOR flash memory).

According to an embodiment of the present invention, the internal memory 332 may be a Solid State Drive (SSD). The external memory 334 may further include flash drive, for example, compact flash (CF), secure digital (SD), micro secure digital (Micro-SD), mini secure digital (Mini-SD), extreme digital (xD), or memorystick. The external memory 334 may be functionally connected to the electronic device 300 through various interfaces. According to an embodiment of the present invention, the electronic device 300 may further include a storage device (or a storage medium) such as a hard drive.

The sensor module 340 may detect a direction that the screen faces, a screen touch, drag, or gesture, or a rotation of the electronic device 300. The sensor module 340 measures physical quantities or detects an operating state of the electronic device 300, thereby converting the measured or detected information into electrical signals.

The sensor module 340 may include at least one of a gesture sensor 340A, a gyro sensor 340B, a pressure sensor 340C, a magnetic sensor 340D, an acceleration sensor 340E, a grip sensor 340F, a proximity sensor 340G, a color sensor 340H (for example, a red, green, blue (RGB) sensor), a bio sensor 340I, a temperature/humidity sensor 340J, an illumination sensor 340K, and a ultra violet (UV) sensor 340M. The temperature/humidity sensor 340J may detect a temperature of each unit. Additionally/alternately, the sensor module 340 may include an E-nose sensor (not shown), an electromyography (EMG) sensor, an electroencephalogram (EEG) sensor (not shown), an electrocardiogram (ECG) sensor (not shown), an infra red (IR) sensor (not shown), an iris sensor (not shown), or a fingerprint sensor (not shown). The sensor module 340K may further include a control circuit for controlling at least one sensor therein.

The input device 350 may receive information set as a designated content from a user. Or, in order to switch a direction that the screen faces, the input device 350 may receive screen's touch, drag, and gesture.

The user input device 350 may include a touch panel 352, a (digital) pen sensor 354, a key 356, or an ultrasonic input device 358. The touch panel 352 may recognize a touch input through at least one of capacitive, resistive, infrared, or ultrasonic methods, for example. Additionally, the touch panel 352 may further include a control circuit. In the case of the capacitive method, both direct touch and proximity recognition are possible. The touch panel 352 may further include a tactile layer. In this case, the touch panel 352 may provide a tactile response to a user.

The (digital) pen sensor 354 may be implemented through a method similar or identical to that of receiving a user's touch input or an additional sheet for recognition. The key 356 may include a physical button, a touch key, an optical key, or a keypad. The ultrasonic input device 358, as a device checking data by detecting sound waves through a mic (for example, the mic 388) in the electronic device 300, may provide wireless recognition through an input tool generating ultrasonic signals. According to an embodiment of the present invention, the electronic device 300 may receive a user input from an external device (for example, a computer or a server) connected to the electronic device 200 through the communication module 320.

When the received content corresponds to a designated content and a direction that the screen of the electronic device 300 faces corresponds to a designated direction, the display module 360 displays the received content on the screen. If a direction that the screen of the electronic device 300 faces does not correspond to a designated direction, without displaying the content, the display module 360 may display a notification notifying the reception of the content in a visual format. While there is a content not yet displayed, as a direction that the screen faces switches, the display module 360 may display the received content on the screen.

Or, the display module 360 may not display the content if the electronic device 300 is out of a predetermined distance from a user.

The display module 360 may include a display driving module 362, a panel 364, a hologram device 366, or a projector 368. According to an embodiment of the present invention, the display driving module 362 may further include a control circuit for controlling the panel 364, the hologram device 366, or the projector 368. The panel 364 may include a liquid-crystal display (LCD) or an active-matrix organic light-emitting diode (AM-OLED), for example. The panel 364 may be implemented to be flexible, transparent, or wearable, for example. The panel 364 and the touch panel 352 may be configured with one module. The hologram device 366 may show three-dimensional images in the air by using the interference of light. The projector 368 may display an image by projecting light on a screen. The screen, for example, may be placed inside or outside the electronic device 300.

The interface 370 may include a high-definition multimedia interface (HDMI) 372, a universal serial bus (USB) 374, an optical interface 376, or a D-subminiature (sub) 378. Additionally/alternately, the interface 370 may include a mobile high-definition link (MHL) interface, a secure Digital (SD) card/multi-media card (MMC) interface, or an infrared data association (IrDA) standard interface.

The audio module 380 may convert sound and electrical signals in both directions. The audio module 380 may process sound information inputted/outputted through a speaker 382, a receiver 384, an earphone 386, or a mic 388.

The camera module 391, as a device for capturing a still image and a video, may include at least one image sensor (for example, a front sensor or a rear sensor), a lens (not shown), an image signal processor (ISP) (not shown), or a flash (not shown) (for example, an LED or a xenon lamp).

The power management module 395 may manage the power of the electronic device 300. A battery supplies power to the electronic device 300 through the power management module 395. A fuel gauge may detect the capacity of the battery.

The PMIC may be built in an IC or SoC semiconductor, for example. A charging method may be classified as a wired method and a wireless method. The charger IC may charge a battery and may prevent overvoltage or overcurrent flow from a charger. According to an embodiment of the present invention, the charger IC may include a charger IC for at least one of a wired charging method and a wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added.

The battery gauge may measure the remaining amount of the battery 396, or a voltage, current, or temperature of the battery 396 during charging. The battery 396 may store or generate electricity and may supply power to the electronic device 300 by using the stored or generated electricity. The battery 396, for example, may include a rechargeable battery or a solar battery.

The indicator 397 may display a specific state of the electronic device 300 or part thereof (for example, the AP 310), for example, a booting state, a message state, or a charging state. The indicator 397 may include an LED. The motor 398 may convert electrical signals into mechanical vibration. Although not shown in the drawings, the electronic device 300 may include a processing device (for example, a GPU) for mobile TV support. The processing device for mobile TV support may process media data according to the standards such as digital multimedia broadcasting (DMB), digital video broadcasting (DVB), or media flow.

FIG. 4 is a view illustrating a method of displaying content in an electronic device according to an embodiment of the present invention.

In this embodiment, as an embodiment of the electronic device shown in FIGS. 1 to 3, a smart watch 400 is described as one example. The display screen of the smart watch 400 may be positioned at a certain portion of a wrist. The smart watch 400 may include all forms of wearable devices wrapped on a wrist in addition to a smart band.

As shown at the left of FIG. 4, a user may wear the smart watch 400 to allow the display screen to face a wrist outward direction. When the display screen of the smart watch 400 faces a wrist outward direction, a third person other than a user of the smart watch 400 may view the screen easily. Accordingly, user's information may be exposed. The smart watch 400 may determine whether to display the content on the screen according to a direction that the screen faces.

According to an embodiment of the present invention, the smart watch 400 determines whether a received content corresponds to a designated content and if the received content corresponds to the designated content, the smart watch 400 detects a direction that the screen of the smart watch 400 faces. The smart watch 400 may determine whether the direction that the screen faces corresponds to a designated direction.

According to another embodiment, the smart watch 400 detects a direction that the screen of the smart watch 400 faces and if the direction that the screen faces does not correspond to a designated direction, the smart watch 400 may determine whether a received content corresponds to a designated content.

The designated direction may be a wrist inward direction. Referring to the left of FIG. 4, since the display screen of the smart watch 400 faces a wrist outward direction, that is, a direction that the screen faces does not correspond to a wrist inward direction (i.e., a designated direction), the smart watch 400 may not display the received content on the display screen and may display a notification notifying the reception of the content. The notification notifying the reception of the content may be an icon or text representing the content. Or, the notification notifying the reception of the content may be an icon or text representing a sender of the content. However, the present invention is not limited thereto. The notification may be displayed in various visual formats such as light blinking, a still image, or a dynamic image.

For example, when the received content corresponds to a designated content and the screen faces a wrist outward direction, as shown at the left of FIG. 4, the smart watch 400 may display a message icon representing the received content on the screen, instead of displaying the full text. While there is a content not yet displayed on the smart watch 400, if the direction that the screen faces switches into the wrist inward direction, the smart watch 400 may recognize the switching of the direction that the screen faces and may then display the content on the screen automatically as shown at the right of FIG. 4. The displayed content may be a content of a message received from Paul.

The user may switch the direction that the screen of the smart watch 400 faces by rotating the smart watch 400 in the wrist inward direction. Or, if the screen of the smart watch 400 is a flexible display screen surrounding the entire circumference of a finger, the direction that the screen faces may be switched by touching the screen, taking a predetermined gesture toward the screen, dragging the screen in an active state toward a finger inward direction, or rotating the direction that the screen in an active state faces toward a finger inward direction. The present invention is not limited to the above method of switching the direction that the screen faces in the smart watch 400 and may include various methods of switching the direction of the screen of the smart watch 400.

Thus, according to the direction that the screen faces, the smart watch 400 determines whether to display the content on the screen and displays the content, so that it may screen the eyes of a people other than a user of the smart watch 400.

In this embodiment, the smart watch 400 is described as one example, but another wearable device or electronic device may be applied in a similar manner.

FIG. 5 is a view illustrating a method of displaying content in an electronic device according to an embodiment of the present invention.

In this embodiment, as an embodiment of the electronic device shown in FIGS. 1 to 3, a smart band 500 is described as one example. The smart band 500 may include all forms of wearable devices wrapped on a wrist in addition to a smart watch. The flexible display screen of the smart band 500 may be positioned over an entire wrist area.

As shown at the left of FIG. 5, a user may wear the smart band 500 on the wrist. When a screen in an active state in the display screen of the smart band 500 faces a wrist outward direction, a third person other than a user of the smart band 500 may view the screen easily. Accordingly, user's information may be exposed. The smart band 500 may determine whether to display the content on the screen according to a direction that the screen in an active state faces.

According to an embodiment of the present invention, the smart band 500 determines whether a received content corresponds to a designated content and if the received content corresponds to the designated content, the smart band 500 detects a direction that the screen of the smart band 500 faces. The smart band 500 may determine whether the direction that the screen faces corresponds to a designated direction. According to another embodiment, the smart band 500 detects a direction that the screen of the smart band 500 faces and if the direction that the screen faces does not correspond to a designated direction, the smart band 500 may determine whether a received content corresponds to a designated content.

The designated direction may be a wrist inward direction. Referring to the left of FIG. 5, since the display screen of the smart band 500 faces a wrist outward direction, that is, a direction that the screen faces does not correspond to a wrist inward direction (i.e., a designated direction), the smart band 500 may not display the received content on the display screen and may display a notification notifying the reception of the content on the screen. The notification notifying the reception of the content may be an icon or text representing the content. Or, the notification notifying the reception of the content may be an icon or text representing a sender of the content. However, the present invention is not limited thereto. The notification may be displayed in various visual formats such as light blinking, a still image, or a dynamic image.

For example, when the received content corresponds to a designated content and the screen faces a wrist outward direction, as shown at the left of FIG. 500, the smart band 500 may display a message icon representing the received content on the screen, instead of displaying the full text. The smart band 500 may notify a user that content is received by displaying a message icon on the screen.

While there is a content not yet displayed on the smart band 500, if the direction that the screen faces switches into the wrist inward direction, the smart band 500 may recognize the switching of the direction that the screen faces and may then display the content on the screen automatically as shown at the right of FIG. 5.

A user may switch the direction that the screen in an active state faces toward the wrist inward direction by touching the display screen in the wrist inward direction, dragging the screen in an active state toward the wrist inward direction, taking a predetermined gesture toward the screen, or rotating the direction that the display screen faces toward the wrist inward direction. The present invention is not limited to the above method of switching the direction that the screen faces in the smart band 500 and may include various methods of switching the direction of the screen of the smart band 500.

Thus, according to the direction that the screen in an active state faces, the smart band 500 determines whether to display the content on the screen and displays the content, so that it may screen the eyes of a people other than a user of the smart band 500.

In this embodiment, the smart band 500 is described as one example, but another wearable device or electronic device may be applied in a similar manner.

FIG. 6 is a view illustrating a method of displaying content in an electronic device according to an embodiment of the present invention.

In this embodiment, as an embodiment of the electronic device shown in FIGS. 1 to 3, the smart ring 600 is described as one example.

As shown at the left of FIG. 6, a user may wear the smart ring 600 on the finger. The display screen of the smart ring 600 may be positioned at a certain area of the finger circumference. When the display screen faces a finger outward direction (that is, a direction shown at the left of FIG. 6), a third person other than a user of the smart ring 600 may view the screen easily.

According to another embodiment of the present invention, the flexible display screen of the smart ring 600 may be positioned over an entire finger circumference. When a screen in an active state of the smart ring 600 faces a finger outward direction (that is, a direction shown at the left of FIG. 6), a third person other than a user of the smart ring 600 may view the screen easily. Accordingly, user's information may be exposed.

The smart ring 600 may determine whether to display the received content on the screen according to a direction that the display screen faces. In the case of the smart ring 600 with a flexible display screen, according to a direction that the screen in an active state faces, determination may be made on whether to display the content.

According to an embodiment of the present invention, the smart ring 600 determines whether a received content corresponds to a designated content and if the received content corresponds to the designated content, the smart ring 600 detects a direction that the screen of the smart ring 600 faces. The smart ring 600 may determine whether the direction that the screen faces corresponds to a designated direction.

According to another embodiment, the smart ring 600 detects a direction that the screen of the smart ring 600 faces and if the direction that the screen faces does not correspond to a designated direction, the smart ring 600 may determine whether a received content corresponds to a designated content.

The designated direction may be a finger inward direction. Referring to the left of FIG. 6, since the display screen of the smart ring 600 faces a finger outward direction, that is, a direction that the screen faces does not correspond to a designated direction, the smart ring 600 may not display the received content on the display screen and may display a notification notifying the reception of the content. The notification notifying the reception of the content may be an icon or text representing the content. Or, the notification notifying the reception of the content may be an icon or text representing a sender of the content. However, the present invention is not limited thereto. The notification may be displayed in various visual formats such as light blinking, a still image, or a dynamic image.

For example, when the received content corresponds to a designated content and the screen faces a finger outward direction, the smart ring 600 may display a message icon representing the received content on the screen, instead of displaying the full text of the content.

While there is a content not yet displayed on the smart ring 600, if the direction that the screen faces switches into the finger inward direction, the smart ring 600 may recognize the switching of the direction that the screen faces and may then display the content on the screen.

The user may switch the direction that the screen of the smart ring 600 faces by rotating the smart ring 600 in the finger inward direction. Or, if the screen of the smart ring 600 is a flexible display screen surrounding the entire circumference of a finger, the direction that the screen faces may be switched by touching the screen, taking a predetermined gesture toward the screen, dragging the screen in an active state toward a finger inward direction, or rotating the direction that the screen in an active state faces toward a finger inward direction. The present invention is not limited to the above method of switching the direction that the screen faces in the smart ring 600 and may include various methods of switching the direction of the screen of the smart watch 600.

Thus, according to the direction that the screen faces, the smart ring 600 determines whether to display the content on the screen and displays the content, so that it may screen the eyes of a people other than a user of the smart ring 600.

In this embodiment, the smart ring 600 is described as one example, but another wearable device or electronic device may be applied in a similar manner.

FIG. 7 is a flowchart illustrating a method of displaying content in an electronic device according to an embodiment of the present invention.

Referring to FIG. 7, a method listed in FIG. 7 includes operations processed by the electronic devices 100, 200, and 300 shown in FIGS. 1 to 3. Accordingly, even if certain contents are omitted in this embodiment, contents relating to the electronic devices 100, 200, and 300 shown in FIGS. 1 to 3 may be applied to the method listed in FIG. 7.

In operation 710, the communication module 140 may receive content.

In operation 720, the control unit 120 may determine whether a received content corresponds to a designated content. The designated content may include personal content such as a message, a notification, and a call or information set as personal content in advance by a user.

If the received content corresponds to a designated content, the control unit 120 may perform operation 730. If the received content does not correspond to the designated content, the control unit 120 may perform operation 760.

In operation 730, the direction detection unit 110 may detect a direction that a screen faces.

In operation 740, the control unit 120 may determine whether the detected direction corresponds to a designated direction. For example, the designated direction may be a direction that screens the eyes of a person other than a user of the electronic device.

If the detected direction corresponds to a designated direction, the control unit 120 may perform operation 760. If the detected direction does not correspond to a designated content, the control unit 120 may perform operation 750.

In operation 750, the display module 130 may display a notification notifying the reception of the content without displaying the content. In operation 760, the display module 130 may display content on the screen.

FIG. 8 is a flowchart illustrating a method of displaying content in an electronic device according to an embodiment of the present invention.

Referring to FIG. 8, the method listed in FIG. 8 includes operations processed by the electronic devices 100, 200, and 300 shown in FIGS. 1 to 3. Accordingly, even if certain contents are omitted in this embodiment, contents relating to the electronic devices 100, 200, and 300 shown in FIGS. 1 to 3 may be applied to the method listed in FIG. 8.

In operation 810, the communication module 140 may receive content.

In operation 820, the direction detection unit 110 may detect a direction that a screen faces.

In operation 830, the control unit 120 may determine whether the detected direction corresponds to a designated direction. For example, the designated direction may be a direction that screens the eyes of a person other than a user of the electronic device.

If the detected direction corresponds to a designated content, the control unit 120 may perform operation 860. If the detected direction does not correspond to a designated content, the control unit 120 may perform operation 840.

In operation 840, the control unit 120 may determine whether a received content corresponds to a designated content. The designated content may include personal content such as a message, a notification, and a call or information set as personal content in advance by a user. If the received content corresponds to a designated content, the control unit 120 may perform operation 850. If the received content does not correspond to the designated content, the control unit 120 may perform operation 860.

In operation 850, the display module 130 may display a notification notifying the reception of the content without displaying the content.

In operation 860, the display module 130 may display content on the screen.

FIG. 9 is a flowchart illustrating a method of displaying content in an electronic device according to an embodiment of the present invention.

According to an embodiment of the present invention, the flowchart of FIG. 9 may be positioned at A of the flowchart of FIG. 7 or A of the flowchart of FIG. 8.

In operation 910, the control unit 120 may determine whether the electronic device 100 is positioned within a predetermined distance from a user. The predetermined distance is a distance determined as that a user does not use the electronic device 100. The predetermined distance may vary according to a type of the electronic device 100.

If the electronic device 100 is positioned within the predetermined distance, the control unit 120 may perform operation 920. If the electronic device 100 is positioned out of the predetermined distance, the control unit 120 may perform operation 710. Or, if FIG. 9 is included at A of the flowchart of FIG. 8, operation 810 may be performed.

In operation 920, the display module 130 may display a notification notifying the reception of the content instead of displaying the content on the screen.

FIG. 10 is a flowchart illustrating a method of displaying content in an electronic device according to an embodiment of the present invention.

According to an embodiment of the present invention, the flowchart of FIG. 10 may be positioned at B of the flowchart of FIG. 7 or B of the flowchart of FIG. 8.

In operation 1010, the direction detection unit 110 determines whether a direction that the screen of the electronic device 100 faces switches into the designated direction. According to an embodiment of the present invention, in the electronic device 100, the direction that the screen faces may be switched by at least one of user's touch, drag, and gesture on the screen and a rotation of the electronic device 100.

If the direction that the screen faces switches into the designated direction, the display module 130 may perform operation 1020. If the direction that the screen faces does not switch into the designated direction, the control unit 120 may perform operation 1010.

In operation 1020, the display module 130 may display content on the screen. Accordingly, if the direction that the screen faces switches into the designated direction, the control unit 120 may display the content on the screen without user's additional manipulation.

FIG. 11 is a flowchart illustrating a method of displaying content in an electronic device according to an embodiment of the present invention.

Referring to FIG. 11, the method listed in FIG. 11 includes operations processed by the electronic devices 100, 200, and 300 shown in FIGS. 1 to 3. Accordingly, even if certain contents are omitted in this embodiment, contents relating to the electronic devices 100, 200, and 300 shown in FIGS. 1 to 3 may be applied to the method listed in FIG. 11.

In operation 1110, the direction detection unit 110 may detect a direction that a screen faces. The direction detection unit 110 may identify a direction that the screen faces by using at least one sensor. According to an embodiment of the present invention, if the electronic device 100 corresponds to a wearable device having a flexible display screen, the direction detection unit 110 may determine a direction that the screen faces on the basis of a direction that a screen in an active in the flexible display screen faces.

In operation 1120, the control unit 120 may determine whether to display content on the basis of the detected direction. If the direction that the screen faces corresponds to the designated direction, the control unit 120 may perform a control to display the content on the screen and if the direction that the screen faces does not correspond to the designated direction, the control unit 120 may control the display module 130 not to display the content on the screen. According to an embodiment of the present invention, if the content is not displayed on the screen, the control unit 120 may display a notification notifying the reception of the content on the screen. For example, the notification may include all kinds of visual formats representing the reception of the content.

In operation 1130, the control unit 120 may determine whether there is a content not yet displayed on the screen. If there is a content not yet displayed on the screen, the control unit 120 may perform operation 1140. If there is no content not yet displayed on the screen, the control unit 120 may perform operation 1110.

In operation 1140, the control unit 120 may determine whether to switch the direction that the screen faces. According to an embodiment of the present invention, in the electronic device 100, the direction that the screen faces may be switched by at least one of user's touch, drag, and gesture on the screen and a rotation of the electronic device 100.

If the direction that the screen faces is switched, the control unit 120 may perform operation 1150. If the direction that the screen faces is not switched, the control unit 120 may perform operation 1140.

In operation 1150, the display module 130 may display content on the screen.

The term "module" used in this disclosure, for example, may mean a unit including a combination of at least one of hardware, software, and firmware. The term "module" and the term "unit", "logic", "logical block", "component", or "circuit" may be interchangeably used. "module" may be a minimum unit or part of an integrally configured component. "module" may be a minimum unit performing at least one function or part thereof. "module" may be implemented mechanically or electronically. For example, "module" according to this disclosure may include at least one of an application-specific integrated circuit (ASIC) chip performing certain operations, field-programmable gate arrays (FP-GAs), or a programmable-logic device, all of which are known or to be developed in the future.

According to various embodiments, at least part of a device (for example, modules or functions thereof) or a method (for example, operations) according to this disclosure, for example, as in a form of a programming module, may be implemented using an instruction stored in computer-readable storage media. When at least one processor (for example, the AP 310) executes an instruction, it may perform a function corresponding to the instruction. The computer-readable storage media may include the memory 330, for example. At least part of a programming module may be implemented (for example, executed) by the AP 310, for example. At least part of a programming module may include a module, a program, a routine, sets of instructions, or a process to perform at least one function, for example.

The computer-readable storage media may include Magnetic Media such as a hard disk, a floppy disk, and a magnetic tape, Optical Media such as Compact Disc Read Only Memory (CD-ROM) and Digital Versatile Disc (DVD), Magneto-Optical Media such as Floptical Disk, and a hardware device especially configured to store and perform a program instruction (for example, a programming module) such as Read Only Memory (ROM), Random Access Memory (RAM), and flash memory. Additionally, a program instruction may include high-level language code executable by a computer using an interpreter in addition to machine code created by a compiler. The hardware device may be configured to operate as at least one software module to perform an operation of this disclosure and vice versa.

A module of a programming module according to this disclosure may include at least one of the above-mentioned components or additional other components. Or, some programming modules may be omitted. Operations performed by a module, a programming module, or other components according to this disclosure may be executed through a sequential, parallel, repetitive or heuristic method. Additionally, some operations may be executed in a different order or may be omitted. Or, other operations may be added.

Also, embodiments shown in this specification and drawings are provided as specific examples to describe technical content easily and help understanding and also do not limit the scope of the present invention. Accordingly, it should be interpreted that besides the embodiments listed herein, all modifications or modified forms derived based on the technical ideas of the present invention are included in the scope of the present invention.

The invention claimed is:

1. A wearable electronic device, configured to be worn on a wrist of a body comprising:
    a transceiver configured to receive a content;
    a sensor configured to detect whether a screen is on a palm side of the wrist or a knuckle side of the wrist;
    one or more processors configured to determine whether to display the received content on the basis of whether the received content corresponds to a designated content and whether the screen is on the palm side of the wrist or the knuckle side of the wrist; and
    wherein the screen is configured to display a notification notifying the reception of the designated content without displaying the designated content, when a location of the screen is the knuckle side of the wrist, and the received content corresponds to the designated content, and
    wherein the screen is configured to display the designated content when the location of the screen is on the palm side of the wrist.

2. The wearable electronic device according to claim 1, wherein when the received content corresponds to the designated content, the sensor detects whether the screen is on the palm side of the wrist or the knuckle side of the wrist; and when the received content does not correspond to the designated content, the screen displays the received content.

3. The wearable electronic device according to claim 1, wherein when the location of the screen is on the knuckle side of the wrist, the one or more processors determine whether the received content corresponds to the designated content; and when the location of the screen is on the palm side of the wrist, the screen displays the received content.

4. The wearable electronic device according to claim 3, wherein when the location of the screen is the knuckle side of the wrist and the received content does not correspond to the designated content, the screen displays the received content.

5. The wearable electronic device according to claim 1, wherein the one or more processors control the sensor to detect whether the location of the screen is on the knuckle side of the wrist after the notification is displayed; and the screen displays the content when the location of the screen switches to the palm side of the wrist.

6. The wearable electronic device according to claim 5, wherein the location of the screen about the wrist is switched by a rotation of the wearable electronic device.

7. The wearable electronic device according to claim 1, wherein a control unit determines whether the wearable electronic device is positioned within a predetermined distance from a user; and if the wearable electronic device is positioned out of the predetermined distance from the user, the screen displays a notification notifying the reception of the content on the screen without displaying the content.

8. The wearable electronic device according to claim 1, wherein the designated content is information pre-defined as a personal content.

9. The wearable electronic device according to claim 1, wherein the wearable electronic device is a wearable device having a flexible display; and the direction that the screen faces is a direction that a portion of the flexible display in an active state faces.

10. The wearable electronic device according to claim 1, wherein the sensor comprises an artery recognition sensor, or a skeleton recognition sensor.

11. The wearable electronic device according to claim 1, wherein the transceiver receives, from another electronic device operating in a functional linkage with the wearable electronic device a determination result on whether the received content corresponds to the designated content; and the one or more processors determine whether the received content corresponds to the designated content on the basis of the received determination result.

12. A method of displaying content on a wearable electronic device configured to be worn on a finger of a body, the method comprising:
   receiving a content;
   determining whether the content corresponds to a designated content;
   when the content corresponds to the designated content, detecting a location of a screen about the finger of the body;
   determining whether the location of the screen about the finger of the body is on an inner side of the finger or an outer side of the finger; and
   when the detected location of the screen is not the inner side of the finger, displaying a notification notifying the reception of the content on the screen.

13. The method according to claim 12, further comprising:
   after the displaying of the notification, detecting the location of the screen about the finger of the body; and
   when the location of the screen switches to the inner side of the finger of the body, displaying the content on the screen.

14. The method according to claim 13, wherein the location of the screen on the finger is switched by a rotation of the wearable electronic device.

15. The method according to claim 12, further comprising:
   determining whether the wearable electronic device is positioned within a predetermined distance from a user; and
   when the wearable electronic device is positioned out of the predetermined distance from the user, not displaying the content of the screen.

16. The method according to claim 12, further comprising when the content corresponds to the designated content and the location of the screen is the inner side of the finger, displaying the content on the screen.

17. The method according to claim 12, further comprising when the content does not correspond to the designated content, displaying the content on the screen.

18. The method according to claim 12, wherein the designated content is information pre-defined as a personal content.

19. The method according to claim 12, wherein determining of whether the content corresponds to the designated content comprises: receiving a determination result, from another electronic device operating in a functional linkage with the electronic device, on whether the received content corresponds to the designated content; and determining whether the received content corresponds to the designated content on the basis of the received determination result.

* * * * *